3,129,223
3-NITRO-FURANTOINCARBOXYLIC
ACID ESTERS
Philip N. Gordon, Old Lyme, Conn., assignor to Chas. Pfizer & Co., Inc., New York, N.Y., a corporation of Delaware
No Drawing. Filed Apr. 25, 1962, Ser. No. 189,997
9 Claims. (Cl. 260—240)

This invention relates to new and useful derivatives of nitrofuran. More particularly, it is concerned with certain novel N-substitued nitrofurantoin compounds which have been found to be valuable as antimicrobial agents for the treatment of urinary tract infections.

The compounds of this invention are all represented by the following general structural formula:

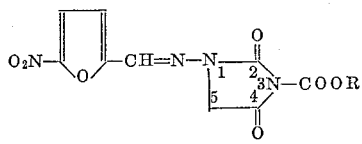

wherein R is alkyl having from one to ten carbon atoms, lower hydroxyalkyl, alkenyl containing up to eight carbon atoms, cycloalkyl having three to eight carbon atoms, cycloalkylalkyl having from four to nine carbon atoms, aralkyl having from seven to thirteen carbon atoms, thenyl, furfuryl, aryl having from six to ten carbon atoms, thienyl and furyl. Typical member compounds of this series include such nitrofurantoin carboxylate esters as methyl 1-(5-nitro-2-furfurylideneamino)-3-hydantoincarboxylate, ethyl 1-(5-nitro-2-furfurylideneamino)-3-hydantoincarboxylate, isopropyl 1-(5-nitro-2-furfurylideneamino)-3-hydantoincarboxylate, n-butyl 1-(5-nitro-2-furfurylideneamino)-3-hydantoincarboxylate, n-hexyl 1-(5-nitro-2-furfurylideneamino)-3-hydantoincarboxylate, neopentyl 1-(5-nitro-2-furfurylideneamino)-3-hydantoincarboxylate, benzyl 1-(5-nitro-2-furfurylideneamino)-hydantoincarboxylate, p-nitrobenzyl 1-(5-nitro-2-furfurylideneamino)-3-hydantoincarboxylate, and the like. All the member compounds of this series allow an excretion in the urine of dosed subjects which is highly antibacterial in character even when said compounds are orally administered.

In accordance with the process employed for the preparation of these compounds, nitrofurantoin or 1-(5-nitro-2-furfurylideneamino)hydantoin, as it is more properly called, is readily converted to the corresponding N-substituted nitrofurantoin by any number of standard procedures previously described in the literature and preferably by the method which involves using the well-known Schotten-Baumann technique wherein the nitrofurantoin starting material is reacted with the chloroformate of choice in the presence of a suitable base. In the latter connection, it is desirable that this particular process be carried out in the presence of a tertiary organic amine base and preferably one which also provides a suitable medium in which the reaction can take place. Typical examples of such bases for these purposes include triethylamine, dimethylaniline, pyridine, picolines, collidines, lutidines, quinoline and C-ring substituted quinolines. In general, enough base will be used to combine with the liberated hydrogen halide that forms as a by-product of this reaction. For optimum results, it is preferable that at least one mole of base be employed for each mole of nitrofurantoin reactant used in this particular process.

Illustrative of the various chloroformates which may be used in this reaction are methyl chloroformate, ethyl chloroformate, allyl chloroformate, cyclohexyl chloroformate, benzyl chloroformate, phenyl chloroformate, α-naphthyl chloroformate, and the like. The reaction is ordinarily conducted under anhydrous conditions and preferably in the presence of a reaction-inert organic solvent in which both the reactants and the organic base are mutually miscible. Preferred solvents in this connection include halogenated hydrocarbon solvents such as methylene chloride, chloroform, carbon tetrachloride, ethylene dichloride, s-tetrachloroethane, and the like, as well as lower alkyl nitriles such as acetonitrile and propionitrile, and aromatic hydrocarbon solvents like benzene, toluene, xylene, etc., in addition to N,N-di(lower alkyl) derivatives of lower alkane hydrocarbon carboxamides like dimethylformamide, dimethylacetamide, diethylformamide, diethylacetamide, and so forth. Usually, a reaction time period of from two to five hours is sufficient in most instances in order to ensure completeness of reaction, although it may be found most convenient under certain circumstances in practice to allow the reaction mixture to stand overnight at room temperature. Upon completion of this step, the resulting 3-substituted nitrofurantoin product is then recovered from said solution by any number of standard isolation techniques, and preferably by the method which involves evaporation of said solution under reduced pressure and the subsequent recrystallization of the product so isolated.

As previously indicated, the herein described nitrofurantoins of this invention are all readily adapted to therapeutic use as antimicrobial agents and/or as urinary antiseptic agents. For instance, such compounds as the lower alkyl 1-(5-nitro-2-furfurylideneamino)-3-hydantoincarboxylates all exhibit excellent activity in vivo when administered to rats that are infected with such different type microorganisms as *Proteus vulgaris*, *Salmonella typhosa*, *Escherichia coli*, *Pseudomonas aeruginosa*, *Aerobacter aerogenes* and *Streptomyces pyogenes*. Furthermore, the toxicity of these compounds have been found to be quite low when they are administered to mice in amounts that are sufficient to achieve the desired therapeutic effects. Moreover, no other harmful pharmacological side effects have been observed to occur as a result of their administration.

In accordance with a method of treatment of the present invention, one of the herein described nitrofurantoins effective in combatting antibiotic-resistant strains of bacteria can be given to an infected subject via the oral route as previously indicated. In general, these compounds are most satisfactorily administered to said subjects in doses that range from about 5 mg. to about 10 mg. per kg. of body weight per day. Nevertheless, it is to be appreciated that still other variations may also occur in this respect, depending upon the species of animal being treated and its individual response to said medicament, as well as on the particular oral formulation chosen and the time period and interval at which such administration is carried out. In some instances, dosage levels below the lower limits of the aforesaid range may be found to be more than adequate, while in other cases still larger dosages may be employed without causing any harmful or deleterious side effects provided that such higher dose levels are first divided into several smaller doses that are to be administered throughout the day.

In connection with the use of the 3-nitrofurantoincarboxylic acid esters of this invention for the treatment of subjects afflicted with antibiotic-resistant infections, it is to be noted that they may be administered either alone and/or preferably in combination with a pharmaceutically acceptable carrier, and that such administration can be carried out in both single and multiple dosages. More particularly, the novel compounds of this invention can be administered in a wide variety of different dosage forms wherein they are combined with various pharmaceutically acceptable inert carriers in the form of tablets, capsules, lozenges, troches, hard candies, powders, aqueous suspensions, elixirs, syrups, and the like. Such carriers include solid diluents or fillers, liquid aqueous media and various non-toxic organic solvents, etc. Moreover, such oral pharmaceutical compositions may be suitably sweetened and flavored by means of various agents of the type commonly employed for just such a purpose. In general, the therapeutically-effective compounds of this invention are present in such dosage forms at concentration levels ranging from about 0.5% to about 90% by weight of the total composition, i.e., in amounts which are suffiicent to provide the desired unit dosage previously indicated.

For purposes of oral administration, tablets containing various excipients such as sodium citrate, calcium carbonate and dicalcium phosphate may be employed along with various disintegrants such as starch and preferably potato or tapioca starch, alginic acid and certain complex silicates, together with binding agents such as polyvinylpyrrolidone, sucrose, gelatin and acacia; in addition, lubricating agents such as magnesium stearate, sodium lauryl sulfate and talc are often very useful for tabletting purposes. Solid compositions of a similar type may also be employed as fillers in soft elastic and hard-filled gelatin capsules; preferred materials in this connection would also include lactose or milk sugar as well as high molecular weight polyethylene glycols. When aqueous suspensions and/or elixirs are desired for oral administration, the essential active ingredient may be combined with various sweetening and flavoring agents, coloring matter or dyes and, if so desired, emulsifying and/or suspending agents, together with such diluents as water, ethanol, propylene glycol, glycerin, and various like combinations thereof.

This invention is further illustrated by the following examples, which are not to be construed in any way as imposing any limitations upon the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

*Example I*

To a solution of 8.7 g. (0.040 mole) of 5-nitro-2-furfurylideneaminohydantoin (nitrofurantoin) dissolved in 100 ml. of dimethylformamide containing 4.05 g. (0.04 mole) of triethylamine, there was added in a dropwise manner 8.68 g. (0.080 mole) of ethyl chloroformate during the course of a fifteen minute period with constant agitation being maintained throughout the addition. Upon completion of this step, the reaction mixture was stirred for an additional one-half hour at room temperature, i.e., without the aid of any external heating, and then filtered to remove the resulting solid material. The filtrate was then evaporated to dryness under reduced pressure, and the residual material so obtained was subsequently triturated with 50 ml. of water and filtered. The crystalline crop obtained in this manner was then dried in vacuo to constant weight to afford a 9.1 g. yield of ethyl 1 - (5 - nitro-2-furfurylideneamino)-3-hydantoincarboxylate, M.P. 218–220° C., after one recrystallization from acetonitrile-isopropanol (3:1 by volume, respectively).

*Analysis.*—Calcd. for $C_{11}H_{10}N_4O_7$: C, 42.59; H, 3.25; N, 18.06. Found: C, 42.79; H, 3.28; N, 18.23.

*Example II*

The procedure described in Example I was repeated employing in place of the ethyl chloroformate used above an equivalent amount in moles of methyl chloroformate, viz, 7.56 g. or 0.080 mole. The final stirring period in this case was extended to 1.5 hours and the product obtained, viz, methyl 1 - (5-nitro-2-furfurylideneamino)-3-hydantoincarboxylate, amounted to 8.53 g., M.P. 224–227° C., after two recrystallizations from acetonitrile-isopropanol (3:1 by volume, respectively).

*Analysis.*—Calcd. for $C_{10}H_8N_4O_7$: C, 40.61; H, 2.68; N, 18.93. Found: C, 41.00; H, 2.68; N, 19.14.

*Example III*

The procedure of Example I was followed except that 12.20 g. (0.100 mole) of isopropyl chloroformate was employed in place of the ethyl chloroformate used previously. Also, the final stirring period was set for one hour. In this particular case, there was obtained 14.3 g. of isopropyl 1-(5-nitro-2-furfurylideneamino)-3-hydantoincarboxylate, M.P. 205–207° C., after recrystallization from acetonitrile-isopropanol (3:1 by volume, respectively).

*Analysis.*—Calcd. for $C_{12}H_{12}N_4O_7$: C, 44.45; H, 3.72; N,17.28. Found: C, 44.53; H, 3.71; N, 17.27.

*Example IV*

The procedure of Example I was followed except that 7.35 g. (0.060 mole) of n-propyl chloroformate was used in place of the ethyl chloroformate of the first example, and the final stirring period was extended to one hour. In this particular case, the final product obtained was n-propyl 1 - (5-nitro-2-furfurylideneamino)-3-hydantoincarboxylate (9.8 g. yield), M.P. 194–197° C., after recrystallization from acetonitrile-isopropanol (3:1 by volume, respectively).

*Analysis.*—Calcd. for $C_{12}H_{12}N_4O_7$: C, 44.45; H, 3.72; N. 17.28. Found: C, 44.53; H, 3.71; N, 17.27.

*Example V*

The procedure described in Example I was followed except that 8.19 g. (0.060 mole) of n-butyl chloroformate was used in place of the ethyl chloroformate of the first example, and the final stirring time was extended to one hour. In this particular case, the product obtained was n-butyl 1-(5-nitro-2-furfurylideneamino)-3-hydantoincarboxylate (in 12.1 g. yield), M.P. 189–191° C., after recrystallization from acetonitrile-isopropanol (3:1 by volume, respectively).

*Analysis.*—Calcd. for $C_{13}H_{14}N_4O_7$: C, 46.16; H, 4.17; N, 16.56. Found: C, 45.90; H, 4.02; N, 17.74.

*Example VI*

The procedure described in Example I was followed except that 9.04 g. (0.060 mole) of n-amyl chloroformate was used in place of the ethyl chloroformate of the first example, and the final stirring time was extended to one hour. In this particular case, the product obtained was n-amyl 1 - (5-nitro-2-furfurylideneamino)-3-hydantoincarboxylate (in 15.4 g. yield), M.P. 176–177° C., after recrystallization from acetonitrile-isopropanol (3:1 by volume, respectively).

*Analysis.*—Calcd. for $C_{14}H_{16}N_4O_7$: C, 47.73; H, 4.58; N, 15.90. Found: C, 47.65; H, 4.27; N, 16.01.

*Example VII*

The procedure described in Example I was followed except that 13.17 g. (0.080 mole) of n-hexyl chloroformate was employed in place of the ethyl chloroformate of the first example, and the final stirring period was extended to one hour. In this particular case, the product so obtained was n-hexyl 1-(5-nitro-2-furfurylideneamino)-3-hydantoincarboxylate (in 21.1 g. yield), M.P., 170–172° C., after one recrystallization from acetonitrile-isopropanol (3:1 by volume, respectively)

*Analysis.*—Calcd. for $C_{15}H_{18}N_4O_7$: C, 49.18; H, 4.95; N, 15.30. Found: C, 48.92; H, 4.64; N, 16.59.

*Example VIII*

To a well-stirred suspension of 14.3 g. (0.06 mole) of 5-nitro-2-furfurylideneaminohydantoin in 500 ml. of acetonitrile, there were added 6.1 g. (0.06 mole) of triethylamine. The reaction mixture was then cooled to approximately 25° C., while 15.4 g. (0.06 mole) of benzyl chloroformate was slowly added thereto in a dropwise manner. Upon completion of this step, the solution was stirred for two and one-half hours at room temperature and then filtered to remove the insoluble solid material that had formed within that period, i.e., which had precipitated from solution. The filtrate was then concentrated to dryness under reduced pressure and triturated with 50 ml. of water. The crystalline crop which resulted was then collected on a filter funnel, washed thereon with cold water and dried in vacuo to constant weight to afford 6.0 g. of benzyl 1-(5-nitro-2-furfurylideneamino) - 3 - hydantoincarboxylate, M.P. 195–198° C. (decomp.).

*Example IX*

The procedure described in Example VIII was followed, employing in place of benzyl chloroformate 19.4 g. (0.09 mole) of p-nitrobenzyl chloroformate instead. In this manner, there was obtained 18.3 g. of p-nitrobenzyl 1-(5 - nitro - 2 - furylideneamino) - 3 - hydantoincarboxylate, M.P. 218–221° C. (decomp.).

*Example X*

The procedure described in Example VIII was followed, employing in place of benzyl chloroformate 11.2 g. (0.0745 mole) of neopentyl chloroformate (i.e., 2,2,2-trimethylethyl chloroformate) instead. In this manner, there was obtained 17 g. of neopentyl 1-(5-nitro-2-furfurylideneamino)-3-hydantoincarboxyalte, M.P. 195–199° C. (decomp.).

*Example XI*

The procedure described in Example I is followed to prepare still other 1-(5-nitro-2-furfurylideneamino)-3-hydantoincarboxylate esters by merely employing the appropriate chloroformate ester in each case in place of either ethyl chloroformate itself or any of the other chloroformate esters previously used in the preceding examples. These esters are all used on the same molar basis as ethyl chloroformate was in Example I, viz, 2:1 with respect to the nitrofurantoin component of the reaction mixture. The compounds prepared in this manner are listed below as follows, where the ester group of each corresponds exactly to that of the particular chloroformate of choice employed as reagent in this reaction:

n-Heptyl 1-(5-nitro-2-furfurylideneamino)-3-hydantoincarboxylate
2-ethylhexyl 1-(5-nitro-2-furfurylideneamino)-3-hydantoincarboxylate
n-Octyl 1-(5-nitro-2-furfurylideneamino)-3-hydantoincarboxylate
n-Decyl 1-(5-nitro-2-furfurylideneamino)-3-hydantoincarboxylate
Hydroxymethyl 1-(5-nitro-2-furfurylideneamino)-3-hydantoincarboxylate
β-Hydroxyethyl 1-(5-nitro-2-furfurylideneamino)-3-hydantoincarboxylate
β-Hydroxypropyl 1-(5-nitro-2-furfurylideneamino)-3-hydantoincarboxylate
γ-Hydroxypropyl 1-(5-nitro-2-furfurylideneamino)-3-hydantoincarboxylate
Allyl 1-(5-nitro-2-furfurylideneamino)-3-hydantoincarboxylate
Methallyl 1-(5-nitro-2-furfurylideneamino)-3-hydantoincarboxylate
Pentenyl-2 1-(5-nitro-2-furfurylideneamino)-3-hydantoincarboxylate
Octenyl-2 1-(5-nitro-2-furfurylideneamino)-3-hydantoincarboxylate
Cyclopropyl 1-(5-nitro-2-furfurylideneamino)-3-hydantoincarboxylate
Cyclobutyl 1-(5-nitro-2-furfurylideneamino)-3-hydantoincarboxylate
Cyclohexyl 1-(5-nitro-2-furfurylideneamino)-3-hydantoincarboxylate
Cycloheptyl 1-(5-nitro-2-furfurylideneamino)-3-hydantoincarboxylate
Cyclopropylmethyl 1-(5-nitro-2-furfurylideneamino)-3-hydantoincarboxylate
Cyclobutylethyl 1-(5-nitro-2-furfurylideneamino)-3-hydantoincarboxylate
Cyclopentylpropyl 1-(5-nitro-2-furfurylideneamino)-3-hydantoincarboxylate
Cycloheptylmethyl 1-(5-nitro-2-furfurylideneamino)-3-hydantoincarboxylate
Cyclooctylmethyl 1-(5-nitro-2-furfurylideneamino)-3-hydantoincarboxylate
m-Xylyl 1-(5-nitro-2-furfurylideneamino)-3-hydantoinboxylate
β-Pehnylethyl 1-(5-nitro-2-furfurylideneamino)-3-hydantoincarboxylate
p-Chlorobenzohydryl 1-(5-nitro-2-furfurylideneamino)-3-hydantoincarboxylate
2-thenyl 1-(5-nitro-2-furfurylideneamino)-3-hydantoincarboxylate
3-thenyl 1-(5-nitro-2-furfurylideneamino)-3-hydantoincarboxylate
2-furfuryl 1-(5-nitro-2-furfurylideneamino)-3-hydantoincarboxylate
Phenyl 1-(5-nitro-2-furfurylideneamino)-3-hydantoincarboxylate
p-Chlorophenyl 1-(5-nitro-2-furfurylideneamino)-3-hydantoincarboxylate
p-tolyl 1-(5-nitro-2-furfurylideneamino)-3-hydantoincarboxylate
α-Naphthyl 1-(5-nitro-2-furfurylideneamino)-3-hydantoincarboxylate
β-Naphthyl 1-(5-nitro-2-furfurylideneamino)-3-hydantoincarboxylate
2-thienyl 1-(5-nitro-2-furfurylideneamino)-3-hydantoincarboxylate
3-thienyl 1-(5-nitro-2-furfurylideneamino)-3-hydantoincarboxylate
2-furyl 1-(5-nitro-2-furfurylideneamino)-3-hydantoincarboxylate
3-furyl 1-(5-nitro-2-furfurylideneamino)-3-hydantoincarboxylate
3-furfuryl 1-(5-nitro-2-furfurylideneamino)-3-hydantoincarboxylate

*Example XII*

A dry solid pharmaceutical composition is prepared by blending the following materials together in the proportions by weight specified below:

| | |
|---|---|
| Methyl 1-(5-nitro-2-furfurylideneamino)-3-hydantoincarboxylate | 50 |
| Sodium citrate | 25 |
| Alginic acid | 10 |
| Polyvinylpyrrolidone | 10 |
| Magnesium stearate | 5 |

After the dried composition is thoroughly blended, tablets are punched from the resulting mixture, each tablet being of such size that it contains 50 mg. of the active ingredient.

*Example XIII*

A dry solid pharmaceutical composition is prepared by combining the following materials in the proportions by weight specified below:

| | |
|---|---|
| n-Butyl 1-(5-nitro-2-furfurylideneamino)-3-hydantoin carboxylate | 50 |
| Calcium carbonate | 20 |
| Polyethylene glycol (average molecular weight, 4000) | 30 |

The dried solid mixture so prepared is then thoroughly agitated so as to obtain a powdered product that is completely uniform. Soft elastic and hard-filled gelatin capsules containing this pharmaceutical composition are then prepared, employing a sufficient quantity of material in each case so as to furnish 125 mg. of the active ingredient to each capsule.

What is claimed is:

1. A compound of the formula:

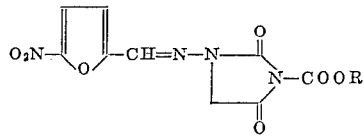

wherein R is a member selected from the group consisting of alkyl having from one to ten carbon atoms, lower hydroxyalkyl, alkenyl containing up to eight carbon atoms, cycloalkyl having from three to eight carbon atoms, cycloalkylalkyl having from four to nine carbon atoms, benzyl, p-nitrobenzyl, β-phenylethyl, m-xylyl, p-chlorobenzohydryl, thenyl, furfuryl, phenyl, p-chlorophenyl, p-tolyl, α-naphthyl, β-naphthyl, thienyl and furyl.

2. Benzyl 1-(5-nitro-2-furfurylideneamino)-3-hydantoincarboxylate.

3. p-Nitrobenzyl 1 - (5-nitro-2-furfurylideneamino)-3-hydantoincarboxylate.

4. Alkyl 1-(5-nitro-2-furfurylideneamino)-3-hydantoincarboxylate wherein the alkyl group has from one to ten carbon atoms.

5. Methyl 1-(5-nitro-2-furfurylideneamino)-3-hydantoincarboxylate.

6. Isopropyl 1-(5-nitro - 2 - furfurylideneamino)-3-hydantoincarboxylate.

7. n-Hexyl 1-(5-nitro-2-furfurylideneamino)-3-hydantoincarboxylate.

8. Neopentyl 1 - (5-nitro-2-furfurylideneamino)-3-hydantoincarboxylate.

9. Cycloalkyl 1 - (5-nitro-2-furfurylideneamino)-3-hydantoincarboxylate wherein the cycloalkyl group has from three to eight carbon atoms.

References Cited in the file of this patent

UNITED STATES PATENTS 3,075,972     Michels _____ Jan. 29, 1963

OTHER REFERENCES

Jack: J. of Med. & Pharm. Chem., vol. 3, No. 2, pp. 253–263, Mar. 1, 1961.

Chem. Abs., vol. 52, cols. 20388 to 20389, 1958; abstract of Toda et al., Chemotherapy (Tokyo), vol. 6, pages 91 to 102, 1958.